Feb. 12, 1957 C. E. POLLARD, JR 2,781,459
POWER CONTROL CIRCUIT
Filed March 24, 1954 2 Sheets-Sheet 1
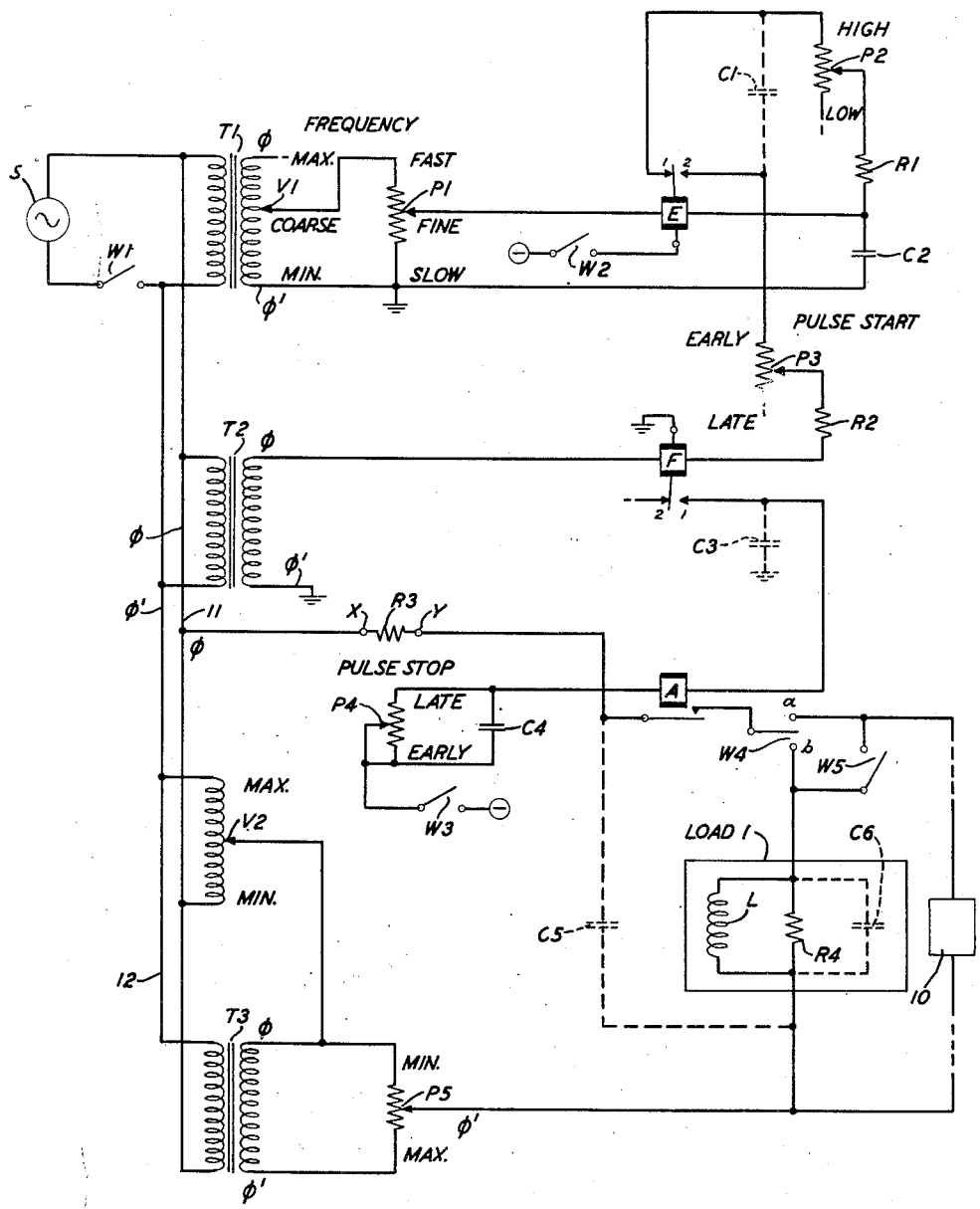
FIG. I
INVENTOR
C. E. POLLARD, JR.
BY
ATTORNEY

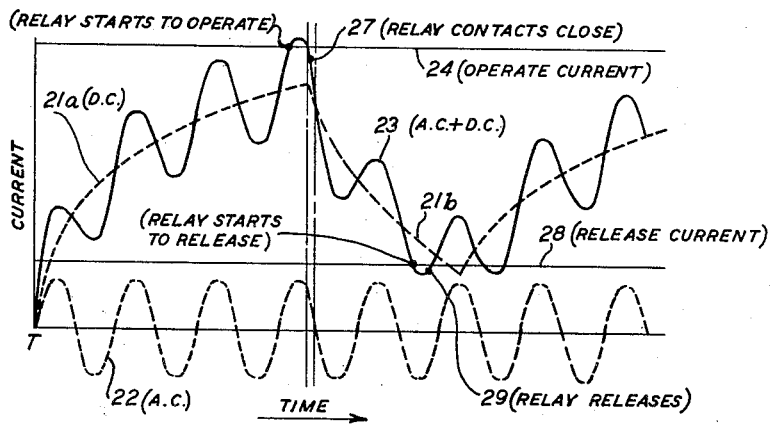
FIG. 2 RELAY E
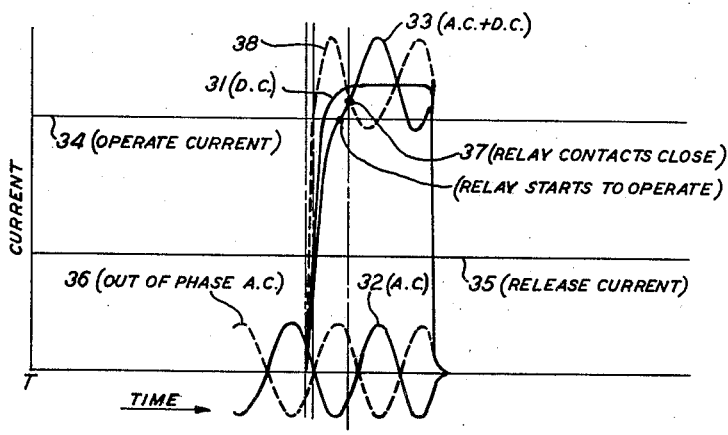
FIG. 3 RELAY F
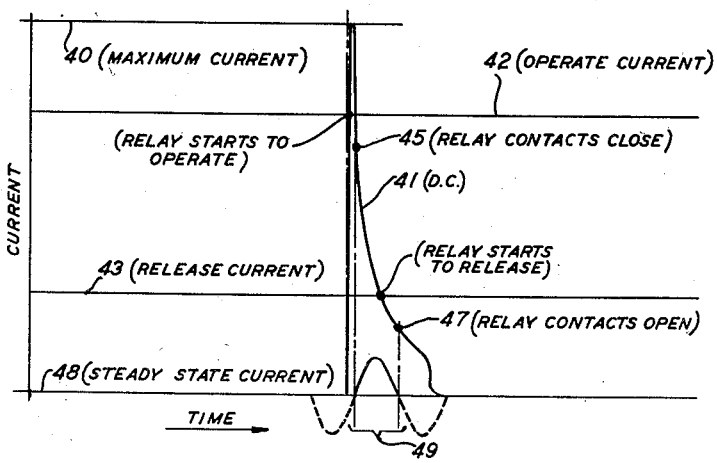
FIG. 4 RELAY A

United States Patent Office

2,781,459
Patented Feb. 12, 1957

2,781,459

POWER CONTROL CIRCUIT

Charles E. Pollard, Jr., Hohokus, N. J., assignor to Bell Telephone Laboratories, Incorporated, New York, N. Y., a corporation of New York Application March 24, 1954, Serial No. 418,396

7 Claims. (Cl. 307—132)

The present invention relates generally to power control circuits and more particularly to timing circuits particularly suitable for use in conjunction with alternating-current power control circuits.

An object of the invention is to connect a source of alternating-current power across a load for a preselected portion of a cycle of such power.

A further object of the invention is to apply alternating-current power across a load at a repetition rate which is a subharmonic of the alternating-current frequency.

Still another object of the invention is to place alternating-current power across the load at any desired time coordinate of the cyclical pattern of the alternating-current power and to remove the power at any later desired time coordinate.

A feature of the invention pertains to means whereby alternating current is superimposed upon direct current through a relay winding to cause the operation of the relay at a repetition rate which is low compared to the rate of the alternating-current frequency and which in the preferred embodiment is a low subharmonic of the alternating-current frequency.

A further feature of the invention relates to means whereby the points in time when alternating-current power is applied to and removed from the load may be adjusted.

The coarse adjustment of the repetition rate of the power control circuit is approximated by utilizing a relay as a relaxation oscillator synchronized by means of an applied alternating-current voltage.

In the conventional multivibrator circuit type of relaxation oscillator, comprising a two-stage resistance coupled amplifier wherein the output voltage of the second stage is applied to the grid of the first stage, the frequency of the multivibrator is varied by varying the values of the coupling capacitors and grid-leak resistances. In a similar manner, the frequency of the present relaxation oscillator utilizing a relay is adjusted by varying a resistance in series with the relay winding across which is shunted a capacitor.

Once the approximate frequency of oscillation of the multivibrator has been set, the application of an alternating voltage from an outside source may be used to cause the multivibrator to adjust in frequency such that the ratio of multivibrator frequency to injected frequency is a ratio of integers. Just as the superimposed alternating voltage in the multivibrator circuit determines the instant at which the grid voltage reaches the tube's cut-off value, etc., the superimposed alternating voltage applied to the first relay in the present power control circuit determines the instant at which the total or composite current through the relay winding reaches the operate current value.

In both cases the resut is that the frequency of the oscillator is synchronized at some subharmonic of the applied alternating voltage, provided, of course, that the oscillator frequency before application of the alternating voltage is less than that of the alternating voltage. The relaxation oscillator frequency is "drawn" toward the alternating voltage frequency as the latter's amplitude is increased.

A more thorough explanation of this synchronization process in relaxation oscillator circuits may be obtained from F. E. Terman's Radio Engineering, 3rd ed., McGraw-Hill, 1947, pp. 586–594 and in the following description of an embodiment of the present invention.

The present invention may be more readily understood from the following description when read with reference to the drawings in which:

Fig. 1 shows the manner in which the relays, the transformers, the potentiometers and other related components are interconnected to form a power control circuit illustrative of this invention;

Fig. 2 is a graph showing the manner in which relay E performs in response to applied direct-current and alternating-current wave forms;

Fig. 3 is a graph showing the manner in which relay F performs in response to applied direct-current and alternating-current wave forms, and is correlated along the time axis with the graph in Fig. 2 depicting the performance of relay E; and Fig. 4 is a graph showing the manner in which relay A performs in response to an applied direct-current wave form, and is correlated along the time axis with the graphs (Figs. 2 and 3) indicating the operative characteristics of relays E and F, respectively.

Looking at the circuit and its mode of operation in detail, it will be noted in Fig. 1 that the closure of switch W1 permits alternating current to flow in the primary windings of transformers T1, T2, and T3 as well as in the winding of "Variac" V2.

When alternating current is applied to the primary winding of transformer T1 it completes a circuit for alternating current including relay E extending from ground through a portion of the secondary winding of the transformer T1, the variac V1 (course frequency adjustment), the fine frequency adjust potentiometer P1, the coil of relay E, the capacitor C2 to ground. This alternating current flowing through relay E is depicted in Fig. 2 by curve 22.

The magnitude of the impressed alternating current can be roughly adjusted by the "Variac" V1 on the secondary winding of the transformer T1. Placing the wiper at the "maximum" side of the secondary winding, other things being equal, allows an alternating current of maximum amplitude to be drawn through relay E, limited only by the transformer T1; whereas, if the wiper is moved towards the "minimum" side of transformer T1, a smaller magnitude of alternating current is available to flow through relay E. Once the coarse adjustment has been made, the potentiometer P1 permits a fine adjustment of the alternating-current magnitude. As the wiper of the potentiometer P1 is moved towards the end designated "fast" the magnitude of the alternating-current wave is maximized; whereas, if the potentiometer wiper is moved towards the "slow" side of the potentiometer P1 the magnitude of the alternating current is decreased toward a minimum.

Parenthetically, it should be observed that the symbol ⊖, wherever employed, denotes negative battery (terminal) with the positive battery (terminal) connected to ground.

The closure of switch W2 completes a circuit for direct current including relay E extending from positive ground and negative battery over the swinger of relay E and its contact 1, and through the percent make potentiometer P2, the resistor R1, the coil of relay E, the lower part of the fine frequency adjust potentiometer P1 to ground.

The closure of switch W2 also completes a parallel direct-current circuit path encompassing capacitor C2 because capacitor C2 is shunted across relay E by being connected directly to one side of the winding of relay E and through potentiometer P1 to the other side.

Capacitor C2 and the resistance in the discharge path, which includes the resistance of the coil of relay E and the resistance of the potentiometer P1 between the wiper and the end designated "slow," shape the exponential decay of the current flowing through relay E whenever the direct-current circuit path is interrupted. This occurs each time the swinger of relay E engages its front or make contact 2. Decay curve 21B (see Fig. 2) exhibits a more gradual slope as the value of the capacitor C2 is increased.

Having chosen an appropriate pattern of direct-current decay through the winding of relay E, variation of the percent make potentiometer P2 performs a dual function. First, it controls the rate of voltage build-up across the capacitor C2 which is the same as controlling the rate of current build-up through the winding of relay E. Second, it adjusts the level of steady state direct current permitted to flow through the winding of relay E.

In respect to the first function, note that the series charge or current build-up circuit comprises the negative battery (positive grounded), the capacitor C2, the resistor R1, and the percent make potentiometer P2. Increasing this circuit's resistance by placing the wiper of potentiometer P2 at the "low" side lengthens the charging time of capacitor C2, or looking at it from the other side, decreases the percentage of time the capacitor C2 will be discharging (i. e., time the swinger of relay E is in contact with its make contact 2) as compared to the time required for a complete cycle of build up and decay. In Fig. 2, curve 21a plus curve 21b represent a complete cycle of build up and decay whereas curve 21b represents the part of the cycle during which capacitor C2 is discharging. Thus, the percent make potentiometer P2 adjusts the percent of the total cycle time during which the contacts of relay E make i. e., the ratio of the time required for current to trace path 21b to the time required for current to trace path 21 (21a and 21b). If the wiper of the potentiometer P2 is at the "high" end, the percent make is high, and reversely, if the wiper is at the "low" end, the percent make is low.

The second function of the potentiometer P2 is to adjust the maximum steady state current which can flow through the coil of relay E. Increasing the resistance of the charge circuit by placing the wiper of potentiometer P2 at the "low" side equally decreases the magnitude of all points on direct-current curve 21 (Fig. 2) which is apparent because the battery voltage is fixed. On the other hand, as the percent make of relay E's contacts is increased (charge circuit resistance decreased), the steady state direct current through the winding increases.

Now that the direct-current and alternating-current paths involving relay E and the possible adjustments thereof are set forth, the performance of relay E as a relaxation oscillator can be specified.

First, with respect to the direct-current adjustments, the percent make potentiometer P2 is set so that the percent make of relay E is approximately 50 percent and the direct current alone flowing through relay E will not operate it more than approximately one time per second. The direct current through relay E adjusted will trace a path similar to curve 21 (see Fig. 2).

Second, with respect to the alternating-current adjustments, referring to Fig. 2, note that curve 23 is a composite of the alternating current 22 superimposed upon the direct current 21. If the magnitude of the alternating current is adjusted to a large value the composite current 23 flowing through relay E will intersect the operate current value 24 and allow relay E to operate at an earlier point in time than if the alternating-current component is adjusted to a small value. It is apparent that the earlier in point of time that relay E is made to operate, the higher its repetition rate per unit of time will be. Variations in the magnitude of alternating current by the frequency adjustments (variac VI and potentiometer P1, see Fig. 1) will permit relay E to be operated at any desired subharmonic repetition rate of the alternating-current frequency. In the present embodiment of the invention, relay E is adjusted to operate approximately four times per second (as compared to a sixty cycle per second source of alternating-current power).

In the specific illustration depicted in Fig. 2, when the composite current 23 flowing through relay E intersects the operate current value 24 the total current through relay E is sufficient to operate the relay. However, there is a small time delay between the time the current obtains this value and the time at which the relay swinger actually closes against its make contact 2 (identified as point 27 in Fig. 2).

When the swinger of relay E has engaged its make contact 2 (depicted at point 27), direct current is removed from relay E and the previously charged capacitor C2 discharges through its discharge path (this assumes that the swinger does not "float" between its break and make positions for any appreciable length of time). When the composite curve value 23 reaches the release current value 28 relay E starts to release and after a short time delay the swinger re-engages the back contact 1 of relay E (depicted at point 29, see Fig. 1).

Therefore, negative battery (positive grounded) is placed on the "early" side of the pulse-start potentiometer P3 each time the swinger of relay E engages its make contact 2.

As was previously pointed out, the closure of switch W1 applies alternating current to the primary winding of transformer T2 as well as to the primary winding of the transformer T1. The alternating currents applied to the primaries of transformers T1 and T2, it is to be noted, are in phase. When alternating current is applied to the primary winding of transformer T2 and negative battery extends to the "early" side of the pulse start potentiometer P3 because of the operation of relay E, a circuit which includes relay F is completed for both alternating and direct current. This series circuit extends from ground through the secondary winding of the transformer T2, the winding of relay F, the pulse start potentiometer P3, and over make contact 2 of relay E to negative battery (positive grounded).

Because relay F has no capacitance shunted across its winding the direct-current build-up through its winding each time battery is applied to contact 2 of relay E (point 27 on Fig. 2) is very rapid as illustrated by curve 31 in Fig. 3. The impressed alternating current 32 is superimposed upon the direct current 31 giving a composite current 33 through the coil of relay F.

Fig. 3 indicates that the alternating current portion 32 of the composite current 33 is going negative at the time the direct current and the alternating current are applied to relay F. Thus, the alternating current 32 subtracts from the direct current 31 during the ensuing negative half cycle. This accounts for the "knee" in the composite curve 33 around the operate current value 34. When the composite current 33 intersects the operate current value 34 (see Fig. 3) sufficient current is flowing through the winding of relay F for it to operate. However, relay F's swinger does not contact its front contact 1 until a slightly later point in time identified as point 37. Once the swinger of relay F, which is grounded, contacts front contact 1, ground is applied to one side of the winding of relay A.

The closure of switch W3, coupled with sequential operations of relays E and F which places ground on one side of relay A, completes a direct-current circuit through relay A. This circuit extends from positive ground and negative battery through the parallel RC network comprising the capacitor C4 and the pulse-stop potentiometer P4, the winding of relay A, and over front contact 1 of relay F to ground.

Referring to Fig. 4, it is to be noted that the first surge of current through relay A is limited only by the resistance of its coil since the uncharged capacitor C4 acts initially as a short circuit across the potentiometer P4. On the other hand, the value of the steady-state current (asymptote 48 of the RC current decay curve 41 flowing through the winding of the relay) is determined by the sum of the coil's resistance and the potentiometer P4's resistance. The current through the relay winding depicted as curve 41 in Fig. 4, having been applied to relay A at a point in time corresponding to point 37 (Fig. 3), reaches the surge maximum 40 (Fig. 4) and then decays exponentially towards the steady-state current value 48 as the capacitor C4 charges. The shape of the current exponential decay curve 41 is determined by the time constant of the parallel RC network which includes capacitor C4 and pulse stop potentiometer P4. The initial surge of current exceeds the operate current value 42 of relay A; hence the relay operates. A small delay occurs, however, before relay A's contacts close at point 45. When the magnitude of the current flowing through the winding of relay A decreases to the release current value 43 relay A starts to release and its contact opens at point 47 (Fig. 4).

During the time the contacts of relay A are closed, provided switch W4 is closed against its contact $b$, an alternating-power circuit across the load 1 is completed. This circuit extends from one side of the alternating-power line 11 through the resistor R3, over the contact of relay A, and through switch W4 and its contact $b$, the load 1, the potentiometer P5, and the "Variac" V2 to the other side of the alternating-power line 12.

The pulse-start potentiometer P3 adjusts the point 45 (in Fig. 4) along the time axis at which the contacts of relay A close to place alternating-current power across the load. The pulse-stop potentiometer P4 adjusts the point 47 (in Fig. 4) along the time axis at which the contacts of relay A open to remove alternating-current power from the load. Thus, in accordance with one of the several objects of the present invention, the pulse-start and pulse-stop potentiometers are varied respectively to place alternating-current power across the load 1 at a time coordinate corresponding to a desired instantaneous position of the alternating-current wave form and to remove said power at a time coordinate corresponding to a later desired instantaneous position of the alternating-current wave form.

The pulse-start potentiometer P3 adjusts the cumulative time delay in circuit operations from the point at which relay E operates (Fig. 2, point 27) to the point at which the contacts of relay A close (Fig. 4, point 45). If the wiper of the pulse-start potentiometer P3 is moved to the side of the winding designated "early" which decreases the resistance in relay F's circuit (see Fig. 1) the contacts of relay A will close earlier than they would if the circuit resistance were increased. Referring this to Fig. 4 it means point 45 is moved to the left along the time axis and relay A's contacts close early (i. e., the time interval between the operation of relay E and the closure of relay A's contacts is reduced). Conversely, if the resistance in series with the winding of relay F is increased the contacts of relay A will close late (i. e., Fig. 4, point 45 will be moved to the right). Increasing the resistance reduces the alternating and direct current which can flow through the winding of relay F and effectively moves the composite curve 33 (see Fig. 3) to the right and downward as compared with the one shown. As a result, relay F operates later in point of time which places ground on relay A later in point of time.

Placing the wiper of the pulse-start potentiometer P3 on the "early" side, therefore, minimizes the time delay between the operation of relay E and the closure of relay A's contacts, whereas placing the wiper on the "late" side maximizes the time delay.

The pulse-stop potentiometer P4 cooperating with capacitor C4 on the one hand determines the decay characteristics of the current (curve 41) flowing through relay A after the initial surge of current 40 operates it (Fig. 4, point 45), and on the other hand, in conjunction with the resistance of relay A's coil determines the value of the steady state current asymptote 48 which the RC current decay curve 41 approaches (see Fig. 4). The effect of the potentiometer P4's resistance on these two parameters are contrary ones. Its effect on the value of the steady-state current (depicted at 48) flowing through the coil of relay A is more pronounced than is its effect on the value of the time constant.

Decreasing the time constant of the RC network by decreasing the resistance in parallel with the capacitor C4 (the wiper of potentiometer P4 at the "late" side of winding) will have a tendency to move the exponential current decay curve 41 downward and to the left. The resulting effect of this displacement, a more rapid decay of current through the circuit, should cause a faster release of relay A (earlier in point of time). If this decreasing of the time constant were the only effect of decreasing the potentiometer P4's effective circuit resistance, the paradox of moving the wiper of potentiometer P4 toward "late" to get an early release and vice-versa would be present.

However, the contrary effect on the steady-state current 48 which can flow through the winding of relay A is overriding. The tendency to displace curve 41 downward and to the left, which accompanies the reduction of resistance in the RC network, moves the steady-state current asymptote 48 upward. Hence, as the resistance of the potentiometer P4 is decreased, the magnitude of the asymptotic current 48 is increased and approaches the surge current 40 as a maximum which is reached when the potentiometer P4 is effectively short-circuited. As the asymptote 48 approaches the surge or maximum current 40 which can flow through the relay, the decay or time constant curves associated with successively increasing asymptotic values will intersect the release current value 43 for relay A later and later along the time axis (to the right in Fig. 4). Hence, the overriding effect that the potentiometer P4 has on the steady-state current removes the paradox. To set the wiper of the pulse-stop potentiometer P4 on the end designated "late" displaces the release of relay A to a point later in time, and conversely, setting the wiper on the end designated "early" causes relay A to release earlier.

An oscilloscope placed across the resistance R3 at terminals X and Y of Fig. 1 will reproduce the alternating-current power wave form to be applied to the load as shown along the time axis in Fig. 4. Observing this wave form and adjusting the pulse-start and pulse-stop potentiometers P3 and P4 permits the points to be chosen at which the contacts of relay A will close and open, which in turn determines when the alternating-current power is applied to and removed from the load 1. In the present embodiment of the invention these adjustments have been made to apply alternating-current power to the load 1 when the alternating current begins a positive half cycle and to remove the alternating current when it begins a negative half cycle. This is illustrated on Fig. 4 as interval 49 between points 45 and 47.

The value of the alternating-current power placed across the load 1 in the present embodiment of the invention is determined by the settings of the "Variac" V2 and the potentiometer P5. Values of alternating-current power up to that supplied by the alternating-current source can be applied across the load 1. It should be apparent that the particular value or magnitude of alternating power applied across the load is capable of even larger variations if another alternating-power transformer or even a separate alternating-power source is utilized.

It is also to be noted that the alternating-current power applied across the load 1 is in phase with the alternating-current source S as indicated by φ associated with line 11 and φ' associated with line 12. However, if it is desirable to apply a negative half cycle, instead of a positive half cycle (interval 49 in Fig. 4), across the load it can be accomplished by reversing the load circuit connections at alternating current lines 11 and 12.

It is to be noted in Fig. 2 that when relay E releases, depicted as point 29, the current through relay F substantially instantaneously drops to zero as shown in Fig. 3. This in turn removes ground from the coil of relay A though it will have already released if the circuitry including relay E has been adjusted to operate relay E approximately four times per second. It is readily apparent that relay E starts a new charge-discharge cycle when its swinger reengages back contact 1.

Power will be placed across a number of loads in parallel including loads 1 and 10 if switch W5 is closed and switch W4 is closed against contact b. Alternative load(s) 10 could also be placed in the circuit alone by maintaining switch W5 open and switch W4 against its contact a. While the particular load 1 depicted in Fig. 1 is an RLC circuit comprising an inductance L, a capacitor C6, and a resistor R4, it is, of course, merely illustrative.

It is also to be noted that capacitors C1, C3, C5 and C6 dotted in Fig. 1 can be employed in the power control circuit for the purpose of contact protection though their use is not necessary to the correct functioning of the circuit.

The power control circuit can be made to work if the transformers T1 and T2 are 180 degrees out of phase; however, the adjustment would be very difficult. In the prior description of the circuit's operation, it will be remembered, the windings of the transformers were in phase as phasing designations φ and φ' indicate (see Fig. 1). It can be observed in Fig. 3 that in the out-of-phase case the initial half cycle of the alternating current 36 superimposed on the direct current 31 forms the composite current 38 which flows in the winding of relay F. The primary shortcoming in the shape of this composite current curve 38 is due to the fact that the first half cycle of the alternating current 36 adds to the direct current 31 to form the composite current 38. Hence no "knee" is formed in the curve around the operate current value 34 as was the case in the in-phase embodiment as exemplified by curve 33. The initial "bucking" of the direct current 31 by the alternating current 32 which produces the "knee" in the in-phase situation slows down the rate of change of the composite current with respect to time so that changes in the alternating and/or direct current through the winding of relay F have the effect of moving the operate point for the relay along the line representing the operate current 34. But, in the case of the composite curve 38, the alternating current 36 does not initially "buck" the direct current 31 and, as a result, rather than slowing down the rate of change of the composite current with respect to time the alternating current increases it toward infinity. Variations of the alternating and/or direct current in this latter case do not shift appreciably the operate point of relay F along the line representing the operate current 34 because curve 38 is to all intents and purposes perpendicular to operate current value 34. The setting of the pulse-start potentiometer P4 has a much smaller effect on the time delay in the circuit up to the closure of the contacts of relay A when transformers T1 and T2 are out of phase as compared to the case where they are in phase, but the circuit can be operated with them out of phase. The preferred embodiment of the present invention, however, finds the transformers T1 and T2 in phase.

It is of course obvious to anyone skilled in the art that switches W1, W2, W3, W4 and W5 can be properly ganged instead of operated separately. The switches were considered separately herein simply to lend clarity to the operational description of the power control circuit.

It is to be understood that the above-described arrangements are illustrative of the application of the principles of the invention. Numerous other arrangements may be devised by those skilled in the art without departing from the spirit and scope of the invention.

What is claimed is:

1. A power control circuit comprising a first source of alternating-current power, a second source of direct-current power, switching means, first circuit means controlled by both of said sources to cause said switching means to close and to open periodically at a preselected repetition rate which is an integral multiple of the single cycle rate of and in synchronism with said first source, a load, variable delay means, second circuit means controlled by said switching means and by said delay means to cause a source of power to be applied to said load at a prescribed delay time after said switching means closes and to be removed from said load at a prescribed delay time thereafter.

2. A power control circuit comprising a first source of alternating-current power, a second source of direct-current power, first switching means, first circuit means controlled by both of said sources to cause said first switching means to close and to open periodically at a preselected repetition rate which is an integral multiple of the single cycle rate of and in synchronism with said first source, second switching means, second circuit means controlled by both of said sources and by said first switching means to cause said second switching means to close at a prescribed delay time after said first switching means closes, third circuit means controlled by said second source and by said second switching means to cause said second switching means to open a prescribed delay time after said second switching means closes, and a load circuit connected to a source of power during the closure of said second switching means.

3. A power control circuit comprising a first source of alternating-current power, a second source of direct-current power, first switching means, first circuit means controlled by both of said sources to cause said first switching means to close and to open periodically at a preselected repetition rate which is an integral multiple of the single cycle rate of and in synchronism with said first source, second switching means, second circuit means controlled by said first and second sources and by said first switching means to cause said second switching means to close at a prescribed delay time after said first switching means closes, third switching means, third circuit means controlled by said second source and by said second switching means to cause said third switching means to close and thereafter to open a prescribed delay time after closing, and a load circuit connected to a source of power only during the closure of said third switching means.

4. A power control circuit comprising a first source of alternating-current power, a second source of direct-current power, first switching means, second switching means, first circuit means manually operable to adjust the levels of currents of said first and second sources and to apply said sources to said first switching means to cause said first switching means to close and to open periodically at a preselected repetition rate which is an integral multiple of the single cycle rate of and in synchronism with said first source, second circuit means controlled by said first and second sources in response to the operation of said first switching means to cause said second switching means to close, third circuit means included in said second circuit means and manually operable to adjust a prescribed delay time between the closure of said first switching means and the closure of said second switching means, third switching means, fourth circuit means controlled by said second source in response to the operation of said second switching means to close said third switching means, fifth circuit means included in said fourth circuit means and adjustable to maintain said third switching means closed for a prescribed period of time, and a load circuit connected to a source of power only during the closure of said third switching means.

5. A power control circuit comprising a first source of alternating-current power, a second source of direct-current power, a first switch, a first circuit including a first condenser and controlled by both sources to cause said first switch to close and to open periodically, a first adjustable resistance included in said first circuit and adjustable to synchronize the periodic closings of said first switch with a definite instant of the wave form of said first source and at a rate which is an integral multiple of the single cycle time of said first source, a second switch, a second circuit controlled by both sources and by said first switch to cause said second switch to close and to open in response to respective closings and openings of said first switch, a second adjustable resistance included in said second circuit and adjustable to cause said second switch to close at a definite time delay after said first switch closes, a third switch, a third circuit including a second condenser and controlled by said second source and by said second switch to cause said third switch to close in response to each closing of said second switch, a third adjustable resistance included in said third circuit and adjustable to cause said third switch to open a definite time delay after said second switch operates, and a load circuit connected to said first source of power through said third switch only when said third switch is closed.

6. A power control circuit comprising a first source of alternating-current power, a second source of direct-current power, a first electromagnetic switch having an energizing winding, a first circuit including a first condenser and the winding of said first switch and controlled by both sources to cause said first switch to close and to open periodically, a first adjustable resistance included in said first circuit in series with said first condenser and adjustable to synchronize the periodic closings of said first switch with a definite instant of the wave form of said first source and at a rate which is an integral multiple of the single cycle time of said first source, a second electromagnetic switch having an energizing winding, a second circuit including the winding of said second switch and controlled by both sources and by said first switch to cause said second switch to close and to open in response to respective closings and openings of said first switch, a second adjustable resistance included in said second circuit in series with the winding of said second switch and adjustable to cause said second switch to close at a definite time delay after said first switch closes, a third electromagnetic switch having an energizing winding, a third circuit including a second condenser and the winding of said third switch and controlled by said second source and by said second switch to cause said third switch to close in response to each closing of said second switch, a third adjustable resistance included in said third circuit in shunt of said second condenser and adjustable to cause said third switch to open a definite time delay after said second switch operates, and a load circuit connected to said first source of power through said third switch only when said third switch is closed.

7. A power control circuit comprising a first source of direct-current power; a first relay with an energizable winding and comprising a first armature. a first contact, and a second contact; said first armature arranged to contact said first contact when said first relay is operated and to contact said second contact when said first relay is not operated; a first manual switch operable to apply said first source to said first armature; a charging circuit including said first source, said first armature and said first contact, a per cent make potentiometer, and a first capacitor whereby said first capacitor is charged at a rate controlled by the impedance of said charging circuit; a discharging circuit in shunt of said first capacitor and including the winding of said first relay in series with a fine potentiometer whereby said first capacitor is discharged at a rate controlled by the impedance of said discharging circuit when said first armature is not in contact with said first contact; said per cent make potentiometer and said fine potentiometer manually adjustable to fix the relative impedance of said charging and discharging circuits whereby the level of direct current flowing through said first relay winding is sufficient to operate said first relay approximately one time per second and whereby the relative charge and discharge times of said first capacitor are approximately equal; a second source of alternating-current power; a second manual switch operable to apply said second source to the winding of said first relay through the agency of said fine potentiometer; said fine potentiometer manually adjustable to fix the magnitude of alternating current flowing through the winding of said first relay whereby the composite current comprising the direct and alternating currents flowing through the winding of said first relay in sufficient to cause said first relay to operate and to release at a repetition rate which is an integral multiple of the single cycle rate of and in synchronism with said second source; a second relay with an energizable winding and comprising a second armature and a third contact engaged by said second armature when said second relay is operated; an operating circuit for said second relay and including the winding of said second relay, a pulse-start potentiometer, and said second contact for applying both of said sources to the winding of said second relay when said first relay is operated; said pulse-start potentiometer manually adjustable to fix the level of the composite current flowing through the winding of said second relay whereby a time delay interval between the operation of said first relay and the operation of said second relay is set; a third relay with an energizable winding and including a third armature and a fourth contact engaged by said third armature when said third relay is operated; an operating circuit for said third relay and including the winding of said third relay, a second capacitor, and said fourth contact for applying said first source to the winding of said third relay when said second relay is operated thereby to operate said third relay; a pulse-stop potentiometer in shunt of said second capacitor and manually adjustable to fix the minimum level of direct current through the winding of said third relay at a value below the release current for said third relay whereby said third relay will release a prescribed time delay interval after the operation of said second relay; and a load circuit connected to said second source of power through said fourth contact of said third relay.

References Cited in the file of this patent
UNITED STATES PATENTS

| | | |
|---|---|---|
| 2,524,953 | Baker | Oct. 10, 1950 |
| 2,530,033 | Scoles | Nov. 14, 1950 |
| 2,647,999 | Best | Aug. 4, 1953 |
| 2,666,852 | Hollingsworth | Jan. 19, 1954 |
| 2,684,448 | Nilles | July 20, 1954 |
| 2,688,078 | Bess | Aug. 31, 1954 |
| 2,688,079 | Wachtell | Aug. 31, 1954 |